United States Patent
Yamada et al.

(10) Patent No.: US 8,165,791 B2
(45) Date of Patent: Apr. 24, 2012

(54) VEHICULAR FUEL CONSUMPTION NOTIFICATION APPARATUS AND IN-VEHICLE SYSTEM

(75) Inventors: Kazunao Yamada, Toyota (JP); Yusuke Mizuno, Kariya (JP); Yasushi Sakuma, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/185,640

(22) Filed: Jul. 19, 2011

(65) Prior Publication Data

US 2012/0022775 A1    Jan. 26, 2012

(30) Foreign Application Priority Data

Jul. 20, 2010   (JP) ................... 2010-162791

(51) Int. Cl.
*G06F 19/00*   (2011.01)
(52) U.S. Cl. ....................................... 701/123
(58) Field of Classification Search .............. 701/22, 701/35, 115, 123, 210; 903/903, 906
See application file for complete search history.

(56) References Cited

U.S. PATENT DOCUMENTS

| | | | |
|---|---|---|---|
| 7,761,203 B2* | 7/2010 | Yamada | 701/35 |
| 2002/0084769 A1* | 7/2002 | Iritani et al. | 320/104 |
| 2007/0088493 A1* | 4/2007 | Sterner | 701/123 |
| 2010/0312425 A1* | 12/2010 | Obayashi et al. | 701/22 |
| 2011/0213780 A1* | 9/2011 | Suganuma et al. | 707/740 |
| 2011/0276260 A1* | 11/2011 | Sim | 701/123 |

FOREIGN PATENT DOCUMENTS

| | | |
|---|---|---|
| JP | B2-3833931 | 7/2006 |
| JP | A-2009-31046 | 2/2009 |
| JP | A-2010-85310 | 4/2010 |

* cited by examiner

*Primary Examiner* — Isam Alsomiri
(74) *Attorney, Agent, or Firm* — Posz Law Group, PLC

(57) ABSTRACT

An actual fuel consumption rate and a tentative fuel consumption rate are repeatedly acquired from an air-conditioning apparatus. The tentative fuel consumption rate is a fuel consumption amount per unit time to generate a power consumed under a post-offset preset temperature being different from a present temperature by an offset temperature. Based on the acquired actual fuel consumption rate and the acquired tentative fuel consumption rate, an actual fuel consumption accumulation amount and a tentative fuel consumption accumulation amount are calculated in the same record period and are recorded as a data set in a travel history database. Then, several data sets recorded over the several record periods are read out from the travel history database. The total of the actual fuel consumption accumulation amounts and the total of the tentative fuel consumption accumulation amounts over the read several data sets are notified.

9 Claims, 6 Drawing Sheets

```
SUMMER AV PRESET TEMP    25°C
AIR-CON FUEL CONSUM      15L
IF OFFSET OF N °C        12L

300 YEN SAVED
IF ENDURINGIG N°C
```

```
                         LAST    ERSENT
SUMMER AV PRESET TEMP    25°C    26°C
AIR-CON FUEL CONSUM      15L     12L

300 YEN SAVED
```

VEHICULAR FUEL CONSUMPTION NOTIFICATION APPARATUS AND IN-VEHICLE SYSTEM

CROSS REFERENCE TO RELATED APPLICATION

The present application is based on and incorporates herein by reference Japanese Patent Application No. 2010-162791 filed on Jul. 20, 2010.

FIELD OF THE INVENTION

The present invention relates to a vehicular fuel consumption notification apparatus, an in-vehicle system, a related method, and related program product.

BACKGROUND OF THE INVENTION

[Patent document 1] JP-2003-166868 A

Patent document 1 discloses a an in-vehicle apparatus that displays a present room temperature, a present fuel mileage, a room temperature after change, and a fuel mileage estimate after room temperature change. In this apparatus, after calculating fuel consumption amounts of the air-conditioning apparatus according to a present room temperature and a room temperature after change, respectively, the calculated fuel consumption amounts are reflected on a fuel consumption estimate value.

In the above technology, the room temperature prior to the change only uses a present room temperature. Thus, there is a possibility that the vehicle was not driven by a user under the same temperature as the present room temperature. If the vehicle was not driven in the past under the present room temperature, the user naturally has no experience of driving the vehicle under that present room temperature. That is, the fuel consumption under a temperature that the user has not experienced is used for display as a comparison target for the fuel consumption under the temperature after change. Such a display may result in only providing the user with an unrealistic feeling.

SUMMARY OF THE INVENTION

The present invention takes the above issues into consideration. It is an object of the present invention to provide a user with a fuel consumption display to appeal to a user's actual driving experience to thereby improve convenience of the user.

To achieve the above object, according to a first aspect of the present invention, a fuel consumption notification apparatus for a vehicle having an air-conditioning apparatus is provided as follows. An acquisition section is included to acquire an actual fuel consumption rate and a tentative fuel consumption rate from the air-conditioning apparatus, repeatedly during each of a plurality of record periods. Herein, the actual fuel consumption rate is a fuel consumption amount per unit time required to generate an electric power that the air-conditioning apparatus consumes under a present preset temperature; the tentative fuel consumption rate is a fuel consumption amount per unit time required to generate an electric power that the air-conditioning apparatus consumes under a post-offset preset temperature that is obtained by changing the present preset temperature by a predetermined offset temperature. Further, herein, the record period is from when a predetermined record start condition is fulfilled to when a predetermined record end condition is fulfilled. A record section is included to record in a travel history database repeatedly each of a plurality of data sets, the each of the plurality of data sets containing an actual fuel consumption accumulation amount and a tentative fuel consumption accumulation amount in the each of the plurality of record periods, the record section collecting the plurality of data sets over the plurality of record periods in the travel history database. Herein, the actual fuel consumption accumulation amount is a total fuel consumption amount that is consumed by the air-conditioning apparatus in the each of the plurality of record periods, the actual fuel consumption accumulation amount being calculated based on the actual fuel consumption rate repeatedly acquired by the acquisition section in the each of the plurality of record periods; the tentative fuel consumption accumulation amount is a total fuel consumption amount that is estimated to be consumed by the air-conditioning apparatus in the each of the plurality of record periods under a post-offset preset temperature that is obtained by changing the present preset temperature by the predetermined offset temperature, the tentative fuel consumption accumulation amount being calculated based on the tentative fuel consumption rate repeatedly acquired by the acquisition section in the each of the plurality of record periods. A notification section is included to read the plurality of data sets from the travel history database, and notifies one of (i) the predetermined offset temperature, an actual fuel consumption grand total value, and a tentative fuel consumption grand total value and (ii) the predetermined offset temperature and a difference between the actual fuel consumption grand total value and the tentative fuel consumption grand total value. Herein, the actual fuel consumption grand total value is identical or equivalent to a total of the actual fuel consumption accumulation amounts contained in the plurality of data sets, which are read and which are over the plurality of record periods; the tentative fuel consumption grand total value is identical or equivalent to a total of the tentative fuel consumption accumulation amounts contained in the plurality of data sets, which are read and which are over the plurality of record periods.

The both of or the difference of the actual fuel consumption grand total value and the tentative fuel consumption grand total value is notified along with the offset temperature. Therefore, the user who receives such a notification can know a fuel consumption amount to be saved if enduring a given temperature change that corresponds to the offset temperature.

Further, the travel history database records the actual fuel consumption accumulation amount and tentative fuel consumption accumulation amount based on the preset temperature, which was set in the air-conditioning apparatus during the actual use of the vehicle. The notification based on such amounts can be a notification based on the preset temperature experienced actually by the user in the past. It is thus easy for the user to realize the endurance of the offset temperature. In short, a user can be provided with a fuel consumption display to appeal to the user's actual driving experience; as a result, the convenience of the user can be improved.

According to a second aspect of the present invention, a program product stored in a non-transitory computer-readable media comprising instructions for execution by a computer is provided, the instructions enabling the computer to function as the acquisition section, the record section, and the notification section included in the fuel consumption notification apparatus according to the above first aspect.

According to a third aspect of the invention, an in-vehicle apparatus in a vehicle having an air-conditioning apparatus is provided as follows. An actual fuel consumption rate specification section is included to specify an actual fuel consumption rate, which is a fuel consumption amount per unit time required to generate an electric power that the air-conditioning apparatus consumes under a present preset temperature. A tentative fuel consumption rate specification section is included to specify a tentative fuel consumption rate, which is a fuel consumption amount per unit time required to generate an electric power that the air-conditioning apparatus consumes under a post-offset preset temperature, which is obtained by changing the present preset temperature by a predetermined offset temperature, based on a table that associates temperatures with tentative fuel consumption rates or equivalent values converted from the tentative fuel consumption rates. An acquisition section is included to acquire the actual fuel consumption rate specified by the actual fuel consumption rate specification section and the tentative fuel consumption rate specified by the tentative fuel consumption rate specification section, repeatedly during each of a plurality of record periods, the record period being from when a predetermined record start condition is fulfilled to when a predetermined record end condition is fulfilled. Further, the record section and the notification of the above fuel consumption notification apparatus are also included.

Under the above configuration, an effect equivalent to that of the first aspect can be offered.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
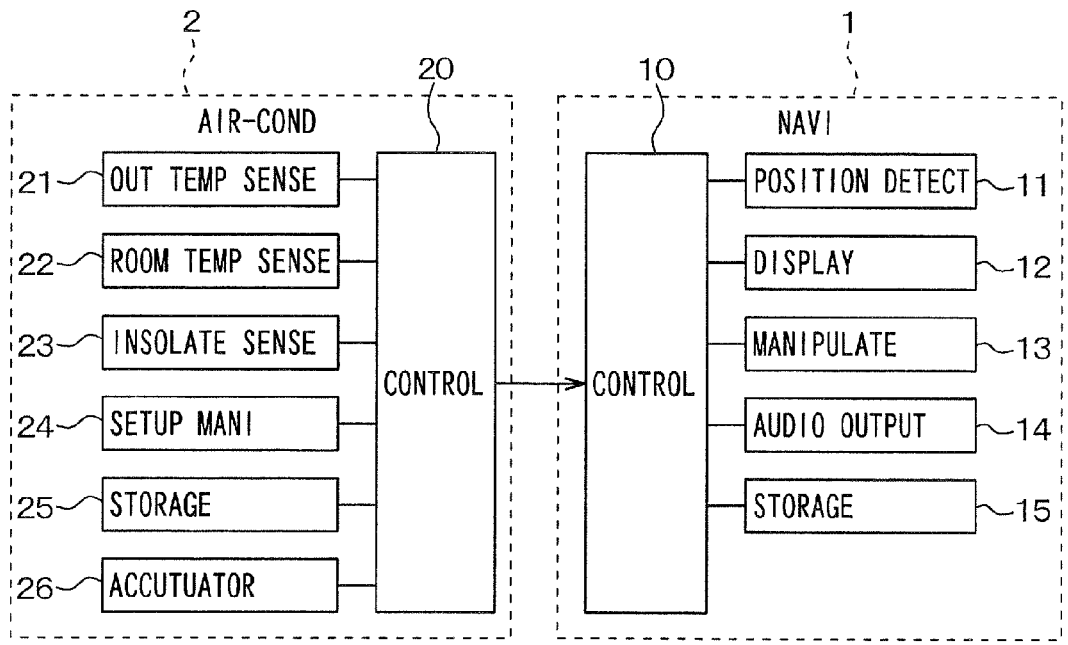
FIG. 1 is a diagram illustrating a configuration of an in-vehicle system according to an embodiment of the present invention.

The following describes an embodiment of the present invention. FIG. 1 is a diagram illustrating a configuration of an in-vehicle system according to an embodiment of the present invention. This in-vehicle system is mounted in a hybrid vehicle, for instance. The hybrid vehicle is a vehicle which is driven by a power of an internal-combustion engine and a power of an electric motor which operates on electric power of a battery.

This in-vehicle system is equipped with a navigation apparatus 1, which serves as an example of a fuel consumption notification apparatus, and an air-conditioning apparatus 2. The navigation apparatus 1 is a known apparatus that calculates an optimal guidance route to a designated destination and guides a user along the calculated guidance route. The air-conditioning apparatus 2 is to adjust a temperature of air which blows off to a vehicle compartment (also referred to as a vehicle room) based on physical quantities acquired from various sensors and a preset temperature set by a user.

The navigation apparatus 1 includes a navigation controller 10 serving as a computer, a position detection device 11, an image display device 12, a manipulation device 13, an audio output device 14, and a storage device 15. The position detection device 11 includes sensors such as a GPS receiver, a vehicle velocity sensor, and a gyro sensor to output a signal for specifying a present position of the vehicle to the navigation controller 10. The image display device 12 includes a liquid crystal display to display characters and/or images for users according to a control of the navigation controller 10. The manipulation device 13 outputs signals to the navigation controller 10 according to an instruction manipulation from the user. The audio output device 14 includes an amplifier and speaker to output sounds in the vehicle compartment according to a control of the navigation controller 10.

The storage device 15 includes a storage media to store data such as map data. The map data includes road data and facility data. The road data indicate positions, shapes, and connection relations of links that express roads. The facility data indicate positions of facilities such as hotels, restaurants, and convenience stores.

In the present embodiment, the storage media is a non-volatile and rewritable type such as a magnetic storage medium, a hard disk, (HDD), and a flash memory. The storage device 15 further stores a travel history database (also referred to as a travel history data) to be mentioned later.

The navigation controller 10 is a control circuit (for example, a microcontroller) equipped with a CPU, RAM, ROM, flash memory, etc. Various processes are achieved by the CPU executing programs stored in the ROM or flash memory.

For example, the navigation controller 10 executes a well-known present position specification process, map display process, route calculation process, route guidance process, etc. The present position specification process is to repeatedly specify a present position (latitude, longitude, or coordinates) of the vehicle based on signals from the position detection device 11. Hereinafter, a newest present position specified by the present position specification process is used as a present position which the navigation controller 10 uses.

The map display process is to display in the image display device 12 a map surrounding the present position based on map data stored in the storage device 15. The route calculation process is to designate or set up a destination based on an instruction manipulation by a user via the manipulation device 13, and calculate an optimal guidance route from the present position to the designated destination based on the map data. The route guidance process is to perform an audio guidance and an image guidance to indicate a right/left turn or the like for guiding the vehicle along the guidance route. Another operation of the navigation controller 10 will be explained later.

The air-conditioning apparatus 2 is equipped with an air-conditioning controller 20, an outside temperature sensor (also referred to an ambient temperature sensor) 21, a room temperature sensor 22 (also referred to as a vehicle compartment temperature sensor), an insolation sensor 23, a setup manipulation device 24, a storage device 25, and an actuator 26.

The ambient temperature sensor 21 is to detect an outside air temperature which is an atmospheric temperature of an outside of the vehicle, and outputs the detected temperature to the air-conditioning controller 20. The room temperature sensor 22 is to detect an inside air temperature which is a temperature of a compartment or room inside of the vehicle, and outputs the detected temperature to the air-conditioning controller 20. The insolation sensor 23 is to detect an amount of insolation on the vehicle and outputs the detected amount to the air-conditioning controller 20. The setup manipulation device 24 includes a touch panel and mechanical keys that receive user's instruction manipulations or setup manipulations, to output signals according to user's manipulations to the air-conditioning controller 20.

The storage device 25 includes a storage media such as a ROM and flash memory to store the various data used by the air-conditioning controller 20. The data stored in the storage device 25 include a power consumption table, which will be explained later.

The actuator 26 is a well-known actuator group such as a blower motor, a compressor, and an air mixing door for air-conditioning control and controlled by the air-conditioning controller 20. Furthermore, in the present embodiment, an actuator of the engine which supplies heat to a heater core is also controlled by the air-conditioning controller 20.

In a vehicle that is driven by only a power of the engine, a heat quantity transmitted from the engine to a known heater core is almost enough or sufficient to heat a vehicle compartment, in general. In contrast, in the hybrid vehicle, in some cases, it is driven by only a power of the motor; thereby, there is a high possibility that the heat quantity transmitted from the engine to the heater core is insufficient to heat the vehicle compartment. Therefore, there are cases that the rotation number of the engine needs to be increased so as to increase the heat quantity transmitted to the heater core for heating the vehicle compartment, in spite of being unnecessary for the travel of the vehicle.

The air-conditioning controller 20 is a control circuit (for example, a microcontroller) equipped with a CPU, RAM, ROM, flash memory, etc. Various processes are achieved by the CPU executing programs stored in the ROM or flash memory.

In detail, the air-conditioning controller 20 performs an air-conditioning control process. In the air-conditioning control process, the air-conditioning controller 20 specifies (i) an outside air temperature based on an output signal of the ambient temperature sensor 21, (ii) a room temperature based on an output signal of the room temperature sensor 22, (iii) an amount of insolation based on an output signal of the insolation sensor 23, and (iv) a preset temperature for the air-conditioning apparatus 2 based on an output signal from the setup manipulation device 24; it controls the actuator 26 suitably so as to achieve the specified preset temperature in the vehicle compartment.

As already explained, in the air-conditioning control process, there is a case where under a vehicle compartment heating state, the rotation number of the engine is increased so as only to increase the heat quantity transmitted to the heater core. The condition to activate such control, and the detailed contents of such control are a well-known technology.

Figure 2:
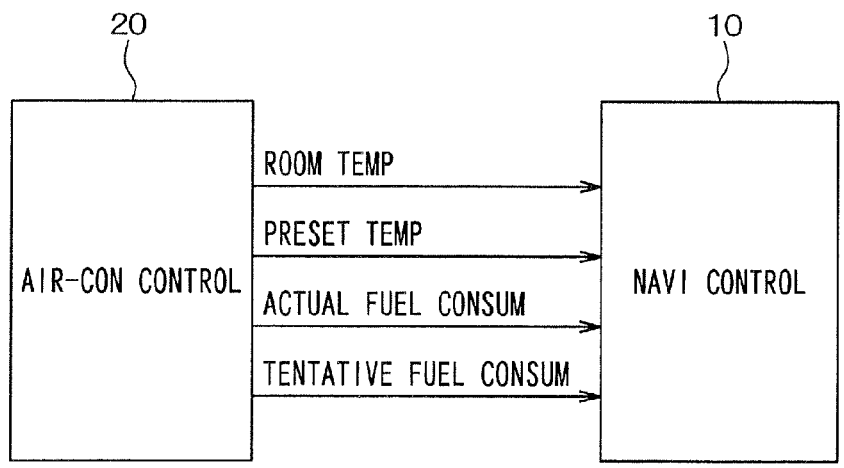
FIG. 2 is a diagram for illustrating information outputted from an air-conditioning controller to a navigation controller.

The following will explain operations of the navigation apparatus 1 and the air-conditioning apparatus 2. As illustrated in FIG. 2, the air-conditioning controller 20 repeatedly outputs to the navigation controller 10 the information, which includes room temperatures, preset temperatures, actual fuel consumption amounts, and tentative fuel consumption amounts.

Therefore, simultaneously with the above air-conditioning control process, the air-conditioning controller 20 performs an information provision process. In the information provision process, during the period from when an ignition switch (IG) of the vehicle is turned into the ON state to when it is turned into the OFF state, the air-conditioning controller 20 repeatedly executes the process illustrated in FIG. 3 with predetermined time intervals (for example, in a cycle of one (1) second).

It is further noted that a flowchart or the processing of the flowchart in the present application includes sections (also referred to as steps), which are represented, for instance, as S110. Further, each section can be divided into several subsections while several sections can be combined into a single section. Furthermore, each of thus configured sections can be referred to as a means or module.

First, at S110, the air-conditioning controller 20 specifies (i) a newest outside air temperature based on an output signal of the ambient temperature sensor 21, (ii) a newest room temperature of the vehicle compartment based on an output signal of the room temperature sensor 22, (iii) a newest amount of insolation to the vehicle based on an output signal of the insolation sensor 23, and (iv) a preset temperature applied to the air-conditioning apparatus 2. This preset temperature is held in the RAM of the air-conditioning controller 20. When the user performs newly a setup manipulation to the setup manipulation device 24, a value of the preset temperature in the RAM is changed. Therefore, specifying the preset temperature to the air-conditioning apparatus 2 is achieved by reading out the value of the preset temperature stored in the RAM.

Then, at S120, an actual power consumption is calculated based on the outside air temperature, the room temperature, the amount of insolation, and the preset temperature, which are specified at S110. The actual power consumption is a power consumption consumed in order that the air-conditioning apparatus 2 operates under the present outside air temperature, the present room temperature, the present amount of insolation, and the present preset temperature.

Figures 3, 4:
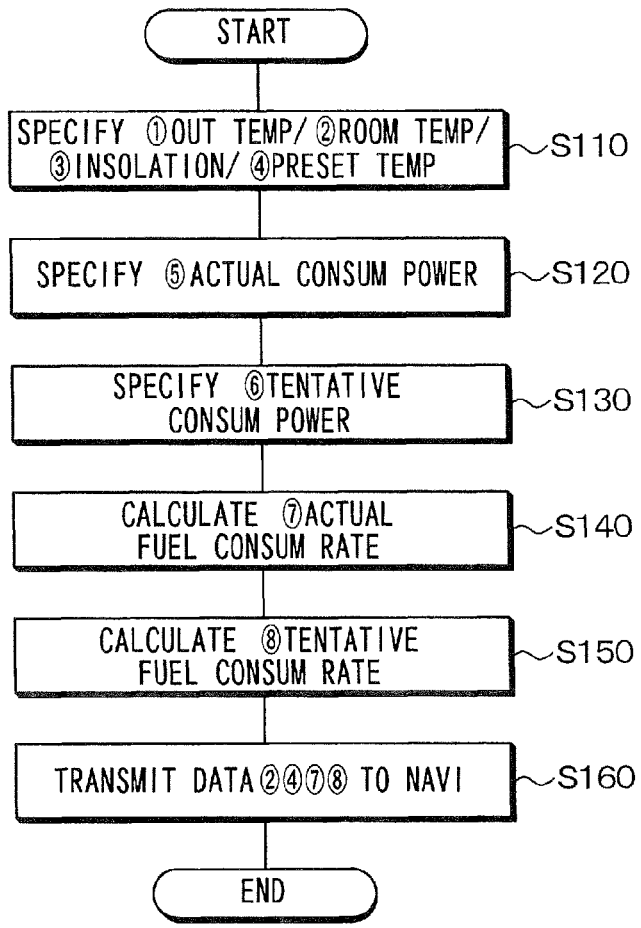
FIG. 3 is a flowchart diagram for illustrating an information provision process executed by the air-conditioning controller.
FIG. 4 is a diagram for illustrating a data configuration of a power consumption table.
Figure 5:
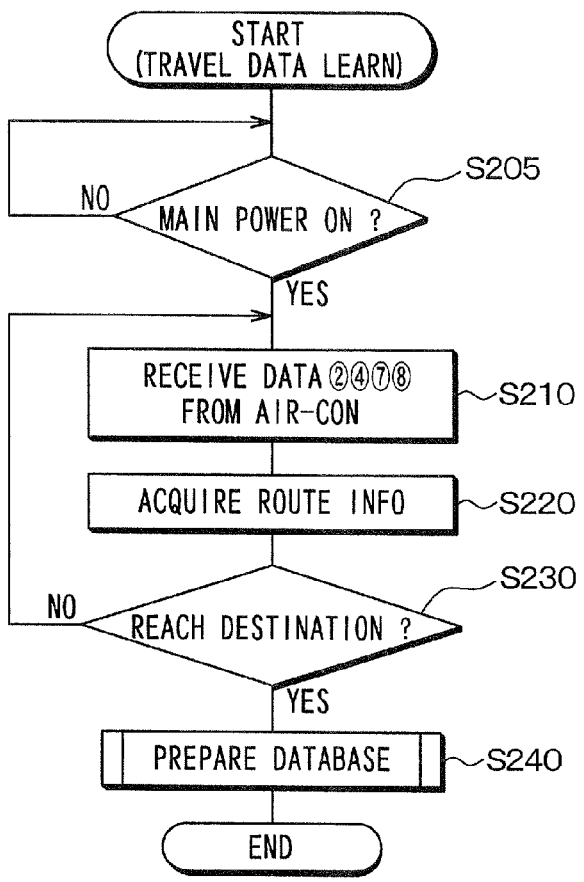
FIG. 5 is a flowchart diagram for illustrating a travel data learning process by the navigation controller.

The calculation of the actual power consumption uses a power consumption table already stored in the storage device 25. The power consumption table is data that are written in the storage device 25 according to a performance of the air-conditioning apparatus 2 at the time of manufacturing of the air-conditioning apparatus 2 itself. FIG. 4 illustrates a data configuration of such a power consumption table. As illustrated, the power consumption table defines several parameter pairs of room temperatures and preset temperatures (e.g., one parameter pair of (i) a room temperature between 35 degrees centigrade to 40 degrees centigrade and (ii) a preset temperature of 24 degrees centigrade). Each parameter pair is assigned with a power consumption of the air-conditioning apparatus 2 when the preset temperature as one of the parameter pair is set up in the air-conditioning apparatus 2 under the room temperature as the other of the pair. That is, blanks in FIG. 4 are assigned with power consumptions, respectively. There are some features in assignment of the power consumptions in this power consumption table. At first, with respect to the cooling state where a preset temperature is lower than a room temperature, a power consumption increases as a temperature difference, which is a result of subtracting the preset temperature from the room temperature, increases. It is noted that even when the temperature differences between the room temperatures and preset temperatures are the same value, the power consumptions differ depending on the room temperatures, respectively. In detail, the power consumption increases as the room temperature increases even if the above difference is identical or unchanged.

In contrast, with respect to the heating state where a preset temperature is higher than a room temperature, there are cases where a power consumption is greater than zero. This is because the rotation number of the engine may be raised only for heating in the hybrid vehicle, as mentioned above. In the heating state, a power consumption increases as a temperature difference, which is a result of subtracting the room temperature from the preset temperature, increases. It is noted that even when the temperature differences between the room temperatures and preset temperatures are identical, the power consumptions differ depending on the room temperatures. In detail, the power consumption decreases as the room temperature increases.

In addition, in the power consumption table, the divisional ranges with respect to the room temperatures and preset temperatures may be different depending on the performances of the air-conditioning apparatuses. In specific, each preset temperature has a range of one degree centigrade in FIG. 4. Without need to be limited thereto, it may have a range of five degrees centigrade depending on the performance of the air-conditioning apparatus.

At S120, an actual power consumption is specified using such a power consumption table as explained above. At that time, the room temperature and preset temperature specified at S110 may be directly applied to the power consumption table; thereby, the power consumption may be specified from the table and taken to be the actual power consumption.

In contrast, an amendment may be applied using the outside air temperature and amount of insolation which were specified at S110. In detail, based on the outside air temperature and amount of insolation which were specified at S110, the preset temperature specified at S110 is amended; the temperature as a result of the amendment is taken as a post-amendment preset temperature. Then, the post-amendment preset temperature and the room temperature specified at S110 are applied to the power consumption table; the power consumption is thus specified from the table and regarded as the actual power consumption.

In such a case, the amendment of the preset temperature by the outside air temperature is executed as follows. Now, an outside air temperature is defined as Tout; a preset temperature is defined as Tset; and a post-amendment preset temperature is defined as Tref. A formula for amendment to determine Tref is as follows: Tref=Tset+αTout+β (Tout<10); and Tref=Tset+γTout+θ (Tout>10). Thus, a post-amendment preset temperature is calculated by inputting a preset temperature and an outside air temperature. In specific, the coefficients α and β are predetermined such that the preset temperature of 25 degrees is amended to the post-amendment preset temperature of 25 degrees when the outside air temperature is 10 degrees, and is amended to the post-amendment preset temperature of 26 degrees when the outside air temperature is 0 degree.

Further, similarly, the amendment of a preset temperature by the outside air temperature is executed as follows. Now, an amount of insolation is defined as S; a preset temperature is defined as Tset; and a post-amendment preset temperature is defined as Tref. A formula for amendment to determine Tref is as follows: Tref=Tset+AS+B. Thus, a post-amendment preset temperature is calculated by inputting a preset temperature and an amount of insolation. In specific, the coefficients of A and B are predetermined such that the preset temperature of 25 degrees is amended to the post-amendment preset temperature of 25 degrees when the amount of insolation 0 W/m2, and is amended to the post-amendment preset temperature of 24 degrees when the amount of isolation is 1000 W/m2.

Then, at S130, a tentative power consumption is calculated based on the outside air temperature, the room temperature, the amount of insolation, and preset temperature, which are specified at S110. The tentative power consumption is an electric power which the air-conditioning apparatus 2 consumes under the present outside air temperature, the present room temperature, the present amount of isolation, and a post-offset preset temperature. The post-offset preset temperature is obtained by changing the present preset temperature by a given offset temperature N from the present preset temperature.

In the calculation of the tentative power consumption, a post-offset preset temperature is calculated first. In specific, the preset temperature specified at S110 may be changed or moved by a given offset temperature N to obtain a post-offset preset temperature. That is, [post-offset preset temperature] =[preset temperature specified at S110]+[offset temperature N].

In contrast, an amendment may be applied using the outside air temperature and amount of insolation which were specified at S110. In specific, based on the outside air temperature and amount of insolation which are specified at S110, the preset temperature specified at S110 is amended. The temperature as a result of the amendment is defined as a post-amendment preset temperature. Further, the post-amendment preset temperature may be changed or moved by a given offset temperature N to obtain a post-offset preset temperature. That is, [Post-offset preset temperature]=[post-amendment preset temperature]+[offset temperature N].

It is noted that the offset temperature N differs between in the cooling state and in the heating state of the air-conditioning apparatus 2. In detail, the offset temperature N is set to a specified positive value (for example, 1 degree centigrade) in the cooling state; the offset temperature N is set to a specified negative value (for example, −1 degree centigrade) in the heating state. This is because the post-offset temperature has a feature to be a temperature endured by the user of the vehicle for the reduction in the power consumption.

Whether the air-conditioning apparatus 2 is in the cooling state or heating state is determined by comparison of the preset temperature with the room temperature when the post-amendment preset temperature is not calculated, and by comparison of the post-amendment preset temperature with the room temperature when the post-amendment preset temperature is calculated.

After calculating the post-offset preset temperature, the post-offset preset temperature and the room temperature specified at S110 are applied to the power consumption table; thereby, the power consumption is specified from the table and regarded as the tentative power consumption.

Then, at S140, the fuel consumption amount per unit time (any one of one second, 10 seconds, and one minute may be suitable as unit time) required to generate the actual power consumption is calculated from the actual power consumption specified at S120 as an actual fuel consumption rate.

In specific, the actual fuel consumption rate is calculated by a formula [actual fuel consumption rate]=α×[actual power consumption]. Herein, a coefficient α is predetermined for each vehicle and is recorded on the storage device 25.

Then, at S150, from the tentative power consumption specified at S130, the fuel consumption amount per unit time required to generate the tentative power consumption is calculated as a tentative fuel consumption rate.

In detail, the tentative fuel consumption rate is calculated by the formula [tentative fuel consumption rate]=α×[tentative power consumption]. Herein, the above-mentioned coefficient is also used.

Then, at S160, the room temperature specified at S110, the preset temperature specified at S110, the actual fuel consumption rate calculated at S140, and the tentative fuel consumption rate calculated at S150 are outputted to the navigation controller 10.

By repeating the above S110 to S160, the air-conditioning controller 20 outputs data sets, each data set containing a room temperature, preset temperature, actual fuel consumption rate, tentative fuel consumption rate, and offset temperature N, to the navigation controller 10, repeatedly and periodically.

Each data set is received by the navigation controller 10, which executes a travel data learning process simultaneously with above-mentioned various processes.

In the travel data learning process, the navigation controller 10 waits at S205 until a condition that an IG of the vehicle changes from the OFF state to the ON state is fulfilled. Such a condition is one example of a record start condition. When the condition is fulfilled, the navigation controller 10 repeats S210 and S220 until a condition that the vehicle arrives at a destination is fulfilled. Such a condition is one example of a record end condition. A record period is defined as a period from when the condition that the IG of the vehicle is changed from the OFF state to the ON state is fulfilled to when the condition that the vehicle arrives at a destination is fulfilled.

At S210, the navigation controller 10 waits until the data set containing the room temperature, preset temperature, actual fuel consumption rate, and tentative fuel consumption rate are outputted from the air-conditioning controller 20. When the data set is outputted, the data set is recorded in the RAM. At S220, the route information is acquired. In specific, the newest present position (the presently existing position) specified by the present position specification process is recorded in the RAM.

During executing the route guidance process, at S230, the navigation controller 10 determines that the condition that "the vehicle arrives at the destination" is fulfilled when approaching the destination within a predetermined distance, thereby proceeding to S240. In addition, also when the IG of the vehicle is turned from the ON state to the OFF state, it is determined that the condition that "the vehicle arrived at the destination" is fulfilled, then proceeding to S240.

Figure 6:
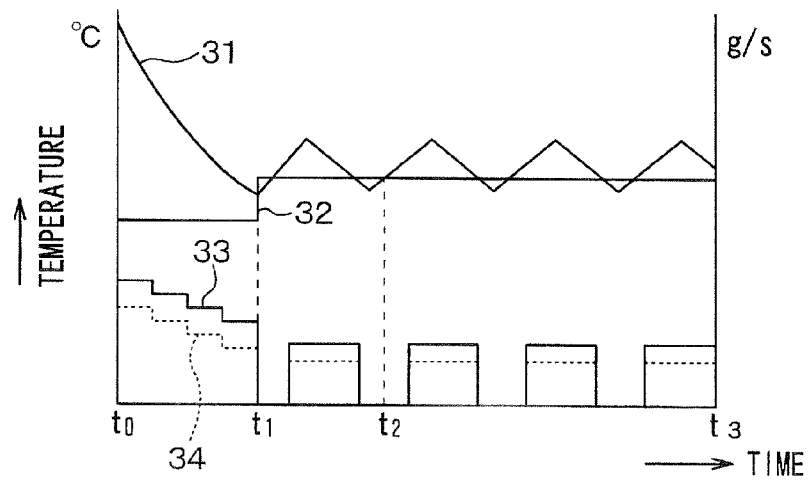
FIG. 6 is a diagram for illustrating a time-based change in a physical quantity received by the navigation controller from the air conditioning controller.

FIG. 6 illustrates a time-based change with respect to the room temperature 31, the preset temperature 32, the actual fuel consumption rate 33, and the tentative fuel consumption rate 34, all of which the navigation controller 10 acquires during one record period t0 to t3. it is noted that the room temperature 31, the preset temperature 32, the actual fuel consumption rate 33, and the tentative fuel consumption rate 34 may vary over time even during one record period; thus, each of the room temperature 31, the preset temperature 32, the actual fuel consumption rate 33, and the tentative fuel consumption rate 34 naturally may indicate several different values during one record period as illustrated in FIG. 6. FIG. 6 provides an example of the time-based change in the cooling state. At the time t0 when the user gets into the vehicle and turns the IG into the ON state, the room temperature 31 is very high. In order that the user may lower the room temperature 31 to a preference temperature shortly, the preset temperature 32 is temporarily set to the value lower than the preferable temperature.

At the time t1 when the room temperature 31 decreases to some extent or near a relatively preference temperature, the user increases the preset temperature 32 to the preference temperature. Then, the room temperature 31 converges to the preset temperature 32. Even after converging, the room temperature changes around the preset temperature 32.

In this case, during an early stage period t0-t1 for which the vehicle compartment is cooled very quickly, the actual fuel consumption rate 33 and the tentative fuel consumption rate 34 become comparatively high values. In a period subsequent to the early stage period, the actual fuel consumption rate 33 and the tentative fuel consumption rate 34 are zero while the room temperature 31 is increasing; the actual fuel consumption rate 33 and the tentative fuel consumption rate 34 are higher than zero while the room temperature 31 is decreasing.

Figure 7:
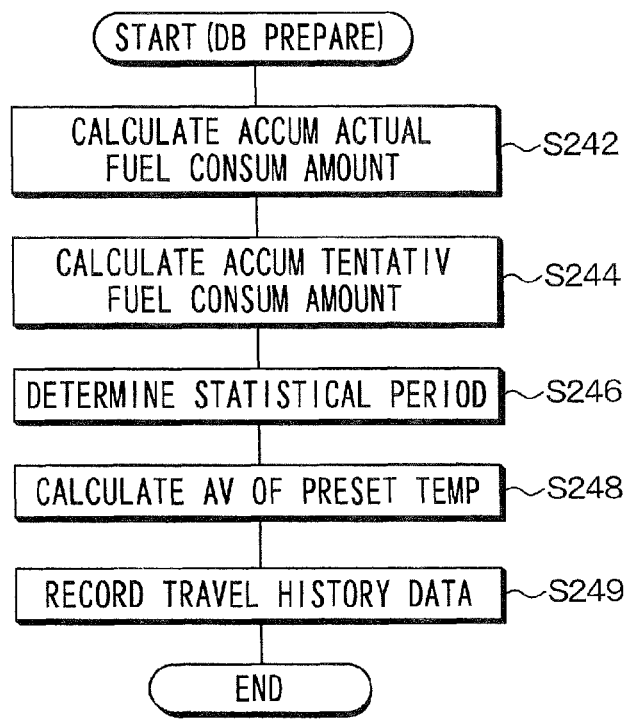
FIG. 7 is a flowchart diagram for illustrating a database preparation process by the navigation controller.

After one record period is completed, the navigation controller 10 can proceed the processing from S230 to S240, thereby executing a database (DB) preparation process. FIG. 7 shows a flowchart of the DB preparation process. In the DB preparation process, the navigation controller 10 calculates an actual fuel consumption accumulation amount. The actual fuel consumption accumulation amount is a total amount of the fuel consumed for the operation of the air-conditioning apparatus 2 within one record period, which ended immediately before. This actual fuel consumption accumulation amount can be obtained as a calculation result from executing a time integration of the actual fuel consumption rate 33 acquired within the record period.

Then, the tentative fuel consumption accumulation amount is calculated at S244. The tentative fuel consumption accumulation amount is estimated by the followings. With respect to the record period that ended immediately before, a post-offset preset temperature is designated by changing the preset temperature of the air-conditioning apparatus 2 from the actual preset temperature by the offset temperature N; and a total amount of the fuel consumed for the operation of the air-conditioning apparatus 2 is estimated within the record period under the designated post-offset preset temperature as the tentative fuel consumption accumulation amount. This tentative fuel consumption accumulation amount can be obtained as a calculation result from executing a time integration of the tentative fuel consumption rate 34 acquired within the record period.

Then, at S246, a statistical period is determined. The statistical period is included within the record period; the statistical period is to start with a time when the room temperature 31 converges to the preset temperature 32 first and is to end with the end time of the record period.

The statistical period is determined as follows. The room temperatures 31 and the preset temperatures 32 which were acquired within the record period are compared with each other, respectively, in a time-based order or chronological order from the start time t0 of the record period. As a result of the comparison, the time t2 is determined to be a time when the room temperature 31 is converged to the preset temperature 32 for the first time. The statistical period is thus defined from when the time t2 to when the end time of the record period.

Whether the room temperature 31 is converged to the preset temperature 32 may be determined differently by the following. For instance, the number of times in switching the large and small relation between the room temperature 31 and the preset temperature 32 is counted since the start time t0 of the record period. The number of times in switching may be referred to as a switching count. That is, in FIG. 6, it is the number of times the room temperature 31 intersects the preset temperature 32. When the switching count reaches a predetermined number (e.g., four times in FIG. 6), it may be determined that the room temperature 31 is converged to the preset temperature 32.

Further, otherwise, when a reference time (e.g., one minute) elapses under the state where an absolute value of the difference between the room temperature 31 and the preset temperature 32 is less than a reference value (e.g., two degrees), it may be determined that the room temperature 31 is converged to the preset temperature 32.

Then, at S248, an average value (also referred to as a representative value) or an average preset temperature (also referred to as a representative preset temperature) is calculated with respect to the preset temperatures acquired from the air-conditioning controller 20 in the statistical period.

Figure 8:
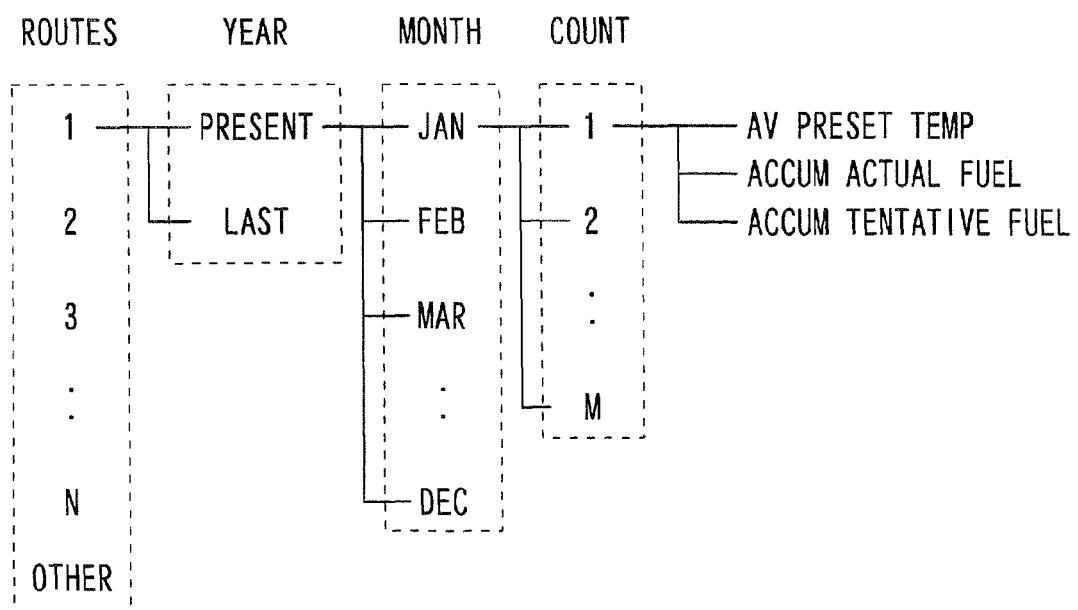
FIG. 8 is a diagram for illustrating a data configuration of a travel history database.

At S249, as illustrated in FIG. 8, the following data set is additionally recorded in the travel history database: the data set contains the actual fuel consumption accumulation amount calculated at S242, the tentative fuel consumption accumulation amount calculated at S244, the average preset temperature calculated at S248. It is noted that the data set is additionally recorded in the travel history data in association with the previously registered route, present year, present month, and serial number assigned to the present year and month.

The route associated with the data set is one of previously registered routes (for example, through a registration operation by a user using the manipulation device 13), while the route contains or passes through all the positions of the vehicle specified during the record period.

It is noted that the registered route may be registered as a group of the positions (latitudes, longitudes) contained in the route, or as a group of the links contained in the route. In addition, the serial number of the record period in the present year and month indicates what number DB preparation process in the present month of the year the present DB preparation process is.

In addition, there may be a case where the route passing through all the specified positions of the vehicle within the record period is not included in the registered routes. In such a case, such a route is recorded in the travel history database in association with a classification item of "other routes", the present year, present month, and the serial number in the present month of the year.

Each time executing the DB preparation process after the end of the record period, the navigation controller 10 calculates the actual fuel consumption accumulation amount, tentative fuel consumption accumulation amount, and average preset temperature in the statistical period. Thus calculated data set is recorded in the travel history database in association with the route passing through the positions of the vehicle specified during the record period, present year, present month, and serial number in the present month of the year.

When the navigation controller 10 repeatedly executes such a process in each of several record periods to result in recording or collecting several data sets in the travel history database. Herein, each of the data sets includes the actual fuel consumption accumulation amount, tentative fuel consumption accumulation amount, and average preset temperature.

Figure 9:
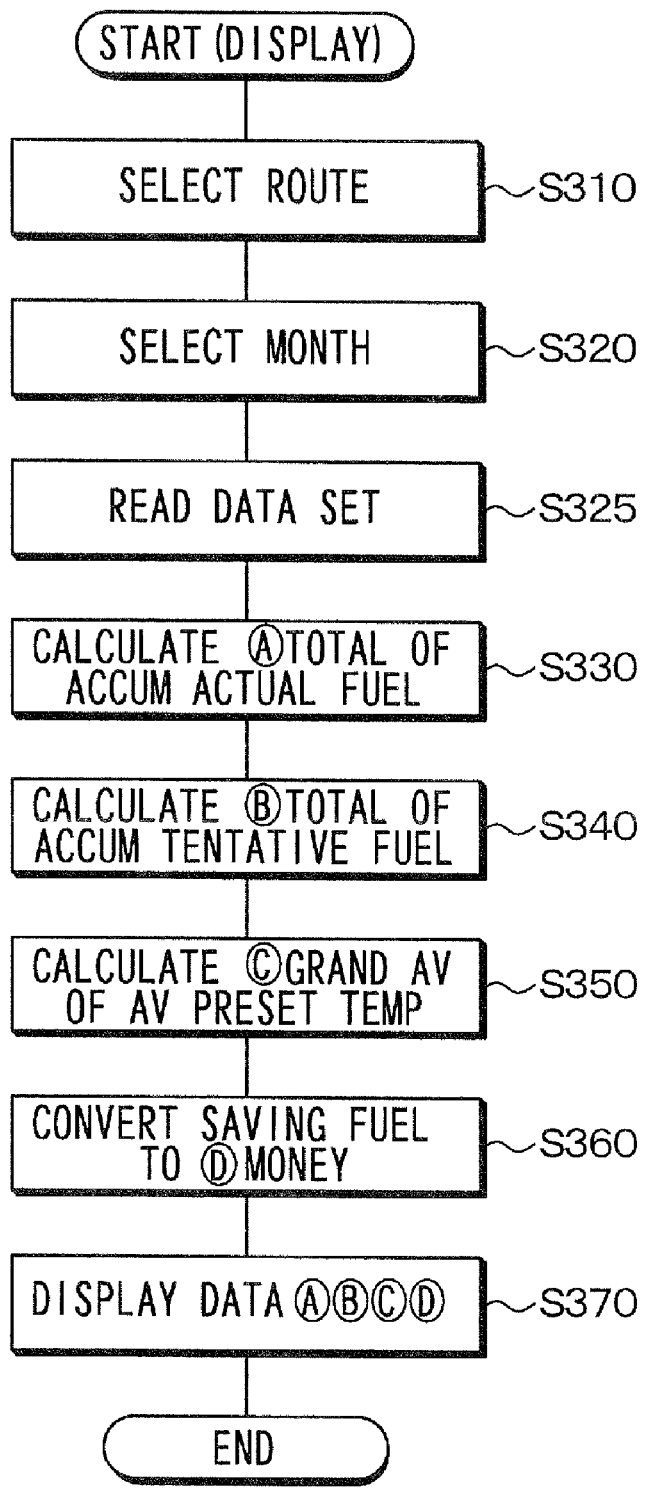
FIG. 9 is a flowchart diagram for illustrating a notification process by the navigation controller.

The navigation controller 10 executes a notification of the fuel consumption using the above travel history database. To that end, the navigation controller 10 executes a notification process as illustrated in FIG. 9.

The navigation controller 10 starts the notification process when the navigation apparatus 1 is started up or when the user executes an instruction manipulation to start the notification process to the manipulation device 13. At S310, one route is selected first. Otherwise, the route classification item of "the other routes" may be selected.

Selecting a route is determined by a user's manipulation to the manipulation device 13. For example, at S310, the navigation controller 10 reads out all the routes, each of which is recorded in the travel history database in association with the data set of the actual fuel consumption accumulation amount, tentative fuel consumption accumulation amount, and average preset temperature. These read routes are displayed in the image display device 12. The navigation controller 10 waits for the user to manipulate the manipulation device 13 for designating one of the routes. When designated, the designated route is selected as the selected route.

In addition, one example case is that the user designates a destination using the manipulation device 13 and the navigation controller 10 calculates a guidance route in the route calculation process. In such a case, the navigation controller 10 determines whether there is recorded in the travel history database a route that is identical to the above calculated guidance route. If there is recorded, the route in the travel history database identical to the calculated guidance route may be selected.

In addition, another example case is that the user designates a destination using the manipulation device 13 and the navigation controller 10 calculates a guidance route in the route calculation process, similarly. In this case, also, the navigation controller 10 determines whether there is recorded in the travel history database a route that is identical to the above calculate guidance route. In contras, if there is not recorded, the route classification item of "other routes" may be selected.

Then, at S320, a season (spring, summer, autumn, winter) is determined and the month corresponding to the determined season is selected. The season may be determined based on the manipulation to select a season via the manipulation device 13 or based on the season to which the present date belongs. The association relation between the seasons and the months is predetermined. For example, June to August are associated with the summer.

Figures 10, 11, 12:
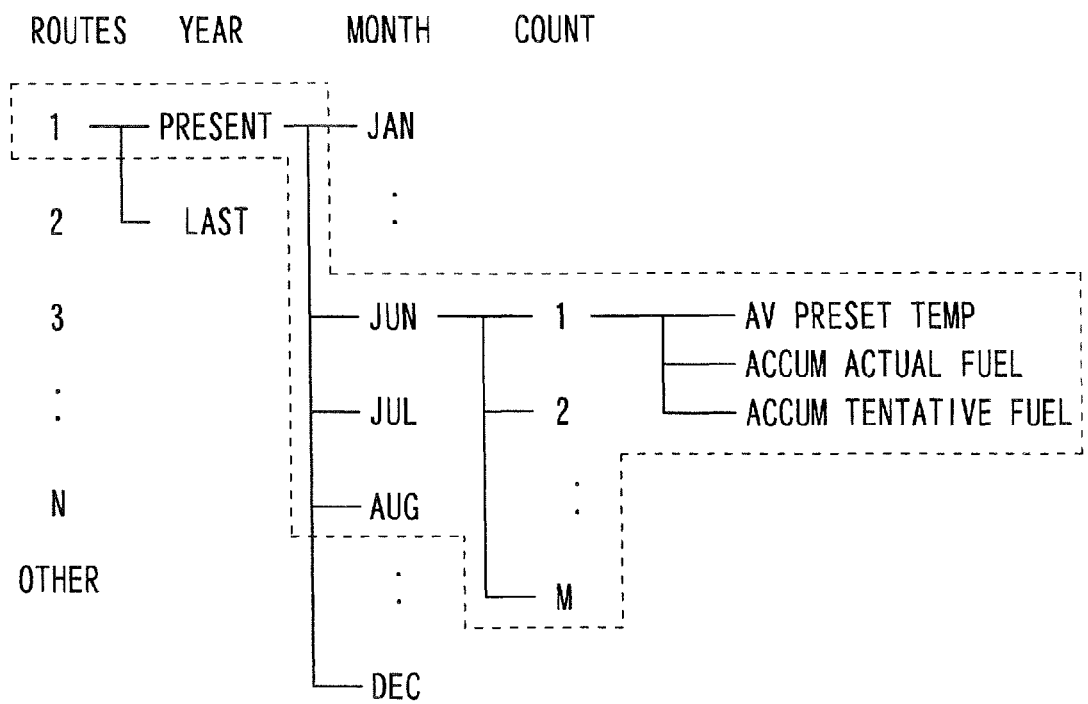
FIG. 10 is a diagram for illustrating an example in use of the travel history database.
FIG. 11 is a diagram for illustrating an example of a fuel consumption notification.
FIG. 12 is a diagram for illustrating another example of a fuel consumption notification.

At S325, the navigation controller 10 reads out the data sets of the actual fuel consumption accumulation amounts, tentative fuel consumption accumulation amounts, and average preset temperatures, all of which are stored in the travel history database in association with the route selected at S310, the present year, and the month selected at S320. FIG. 10 provides an example case to call up from the travel history database the data sets of the actual fuel consumption accumulation amounts, tentative fuel consumption accumulation amounts, and average preset temperatures, with respect to a specified route in the summer season (June of the present year to August of the present year).

Then, at S330, the total of all the actual fuel consumption accumulation amounts contained in the data sets read out or called up at S325 is calculated as an actual fuel consumption grand total value. Then, at S340, the total of all the tentative fuel consumption accumulation amounts contained in the data sets read out or called up at S325 is calculated as a tentative fuel consumption grand total value. Then, at S350, an average of all the average preset temperatures contained in the data sets read out or called up at S325 is calculated as a preset temperature grand average value (also referred to as a preset temperature grand representative value).

At S360, the total of the tentative fuel consumption accumulation amounts (i.e., the tentative fuel consumption grand total value) is subtracted from the total of the actual fuel consumption accumulation amounts (i.e., the actual fuel consumption grand total value), thereby obtaining a saving fuel amount. The saving fuel amount is converted into a saving money amount. The conversion from the saving fuel amount to the saving money amount is achieved by multiplying the saving fuel amount by the fuel price per unit amount (gas price, light oil price, etc.). This fuel price may be designated by the user via the manipulation device 13 or a predetermined steady value (for example, 120 yen/liter).

At S370, the navigation controller 10 displays in the image display device 12 the following: the total of the actual fuel consumption accumulation amounts (i.e., the actual fuel consumption grand total value) calculated at S330, the total of the tentative fuel consumption accumulation amounts (i.e., the tentative fuel consumption grand total value) calculated at S340, the average of the average preset temperatures (i.e., the preset temperature grand average value) calculated at S350, the saving money amount calculated at S360, and the offset temperature N.

The displayed offset temperature is assigned by the navigation controller 10 to each season. For example, a predetermined offset temperature (e.g., 1 degree centigrade) for cooling is displayed in spring and in summer; a predetermined offset temperature (e.g., −1 degree centigrade) for heating is displayed in fall and in winter. The offset temperatures for the cooling and heating are assigned with predetermined fixed values in associated with the performance of the air-conditioning apparatus 2, respectively. The display example of the image display device 12 at S330 is illustrated in FIG. 11.

The user who sees such a display knows that in summer, the user drives the vehicle at a preset temperature of 25 degrees centigrade in the selected route (or guidance route) in general, and that if enduring the temperature change by the offset temperature, how much may be saved in the fuel money amount.

Instead of the total of the actual fuel consumption accumulation amounts, the fuel money amount as the result of multiplying the total of the actual fuel consumption accumulation amounts by the coefficient $\alpha$ may be displayed. Instead of the total of the tentative fuel consumption accumulation amounts, the fuel money amount as the result of multiplying the total of the tentative fuel consumption accumulation amounts by the coefficient $\alpha$ may be displayed. Instead of the saving money amount, the saving fuel amount may be displayed.

As explained above, according to the navigation apparatus 1, the travel history database records or collects the several data sets of the actual fuel consumption accumulation amounts, tentative fuel consumption accumulation amounts, and average preset temperatures. Such collected or recorded several data sets are read out to calculate the following: an actual fuel consumption grand total value which is the total of the actual fuel consumption accumulation amounts or a corresponding value obtained by converting the total of the actual fuel consumption accumulation amounts; a tentative fuel consumption grand total value which is the total of the tentative fuel consumption accumulation amounts or a corresponding value obtained by converting the total of the tentative fuel consumption accumulation amounts; and a difference between the calculated actual fuel consumption grand total and the tentative fuel consumption grand total value. Then, both the actual fuel consumption grand total value and the tentative fuel consumption grand total value or the difference between the actual fuel consumption grand total value and the tentative fuel consumption grand total value is notified. In addition, the offset temperature and the preset temperature grand average value (i.e., the preset temperature grand representative value) are also notified. Therefore, the user who receives such a notification can know how much can be saved in the fuel consumption amount, if enduring the predetermined degrees change in the compartment room temperature.

In addition, the travel history database records the actual fuel consumption accumulation amounts and tentative fuel consumption accumulation amounts based on the preset temperatures, which were set in the air-conditioning apparatus 2 during the actual use of the vehicle in the past. A notification based on the above amounts can be on a basis of the preset temperature that was actually experienced by the user. It is thus easy for the user to realistically estimate the endurance against the preset temperature change by the offset temperature in the vehicle compartment. That is, the fuel consumption display can be made so as to appeal to the user's travel experience very much. This enhances the user's convenience.

In addition, the navigation controller 10 records in the travel history database one data set of the actual fuel consumption accumulation amount, the tentative fuel consumption accumulation amount, and the average preset temperature in association with each route that the vehicle travels during one record period. In addition, from all the data sets recorded in the travel history database, several data sets associated with the selected route are read out. The actual fuel consumption grand total value, the tentative fuel consumption grand total value, the offset temperature, and the preset temperature grand average value with respect to the read data sets are notified. Further, the difference between the actual fuel consumption grand total amount and the tentative fuel consumption grand total value may be also notified.

In addition, there may be cases that the preset temperature experienced by the user is different depending on the route. Even in such cases, as explained above, the fuel consumption display can be made with respect to each of the routes that the user traveled so as to appeal to the travel experience of the user. This further enhances the user's convenience.

In addition, the navigation controller 10 records in the travel history database one data set of the actual fuel consumption accumulation amount, the tentative fuel consumption accumulation amount, and the average preset temperature in association with timeframe (year, month, or season) to which the record period belongs. In addition, the timeframe may be selected based on the user's manipulation or the present date. Only the data sets associated with the selected timeframe are read out from all the data sets recorded or collected in the travel history database. The actual fuel consumption grand total value, the tentative fuel consumption grand total value, the offset temperature, and the preset temperature grand average value over the read data sets may be notified. Further, the difference between the actual fuel consumption grand total value and the tentative fuel consumption grand total value may be also notified.

There are cases where the preset temperature differs depending on the timeframe (e.g., season). In such a case, as explained above, the fuel consumption display can be made with respect to each of the timeframes that the user traveled so as to appeal to the travel experience of the user. This further enhances the user's convenience.

In addition, the navigation controller 10 records in the travel history database the representative value of the preset temperatures acquired during a predetermined statistical period contained within a record period along with the pair of the actual fuel consumption accumulation amount and the tentative fuel consumption accumulation amount in the record period. In addition, based on the stored and collected representative values (e.g., average values) of the preset temperatures over the several record periods, the grand representative value (e.g., the grand average value) of the representative values of the preset temperatures may be calculated and notified. The user can thus get roughly the estimate of the preset temperature which the user actually experienced in the past. That is, the user can realistically estimate the notification which indicates the saving in the fuel consumption amount if enduring a temperature change by the predetermined offset temperature.

In addition, the navigation controller 10 takes as a statistical period a period, which starts with a time when the room temperature converges to the preset temperature first, within the record period.

This is because there is a premise as follows. When the room temperature is very high or very low at the time of boarding the vehicle, the user tends to set up so-called an initial or early stage preset temperature to be lower (or higher) than the actually preference temperature so as to bring the room temperature close to the preference temperature earlier. Such an initial preset temperature (i.e., early stage preset temperature) is typically changed into the actual preference temperature when the room temperature becomes close to the preference temperature. Therefore, such an early stage preset temperature has a thin relation with the cenesthesia or body sense of the user after the room temperature is stabilized; thus, it is excluded from the range of the calculation target of the representative value, i.e., the statistical period as mentioned above. The relation between the representative value of the preset temperatures and the user's body sense becomes thicker.

In contrast, there is another premise with respect to the actual fuel consumption accumulation amount and tentative fuel consumption accumulation amount in consideration that the early stage preset temperature is necessary to bring the room temperature close to the preference temperature. That is, there is less necessity of narrowing down the calculation target for the accumulation into the statistical period. By contrast, if narrowing down, the accumulated fuel consumption amount itself may become inaccurate; thus, the calculation target of the accumulation is not narrowed down into the statistical period.

Further, in the present embodiment, the air-conditioning controller 20 may function as an actual fuel consumption rate specification section or means by executing S110, and as a tentative fuel consumption rate specification section or means by executing S120. In addition, the navigation controller 10 may function as an acquisition section or means by executing S210, S220, as a record section or means by executing S240, and as a notification section or means by executing S310 to S370.

Other Embodiments

While there have been described specific preferred embodiments of the present invention, it is to be distinctly understood that the present invention is not limited thereto and includes various modes capable of embodying functions of specifics of the present invention.

(1) For example, the display example in FIG. 11 of the above embodiment may be replaced with a display example in FIG. 12. This display illustrates the preset temperature grand average value and actual fuel consumption amount in the summer this year as well as the preset temperature grand average value and actual fuel consumption amount in the summer last year; it further illustrates a money amount of the fuel that is converted from the result of subtracting the actual fuel consumption amount this year from that last year. Such a display enables the user to know the user's saving record clearly.

(2) The display example in FIG. 11 may omit the actual fuel consumption accumulation amount, tentative fuel consumption accumulation amount, and preset temperature grand average value and illustrates only the saving money amount. In addition, conversely, the saving money amount and the preset temperature grand average may not be illustrated, but only the actual fuel consumption accumulation amount and tentative fuel consumption accumulation amount may be illustrated.

(3) In addition, in the above embodiment, although the statistical period is a part of one record period, the statistical period may be the whole of one record period.

(4) In addition, although the average value is calculated at S248, S350 in the above embodiment, the mode value or median value may be obtained, instead of the average value. That is, a value that needs to be calculated at S248, S350 may be any one belonging to the statistical representative value (i.e., a value of the central tendency).

(5) In addition, although the record start condition is fulfilled when the main power supply (i.e., IG) of the vehicle is turned from the OFF state to the ON state in the above embodiment, such a record start condition may be fulfilled when the vehicle is determined to have started the travel (e.g., the vehicle speed is greater than a predetermined value).

(6) In addition, although the notification at S370 uses the display using the image display device 12 in the above embodiment, it may use the audio output device 14 alone, instead of the image display device 12. In addition, both the image display device 12 and the audio output device may be used together.

(7) In addition, in the above embodiment, the route, which is associated with the data set of the actual fuel consumption accumulation amount, tentative fuel consumption accumulation amount, and average preset temperature at S249, is not necessarily previously registered. For instance, the route, which passes through all the traveled positions of the vehicle specified during the record period, may be newly recorded in the travel history database.

(8) In addition, in the above embodiment, both the navigation controller 10 and the air-conditioning controller 20 previously set up the offset temperatures for the cooling state and heating state in the air-conditioning. However, there is no need to be limited thereto. For instance, at S160 in FIG. 3, the air-conditioning controller 20 may output to the navigation controller 10 the offset temperature N, which is used for calculating the tentative fuel consumption rate, in addition to the room temperature, preset temperature, the actual fuel consumption rate. In contrast, the navigation controller 10 may record in the travel history database each data set of the average preset temperature, actual fuel consumption accumulation, tentative fuel consumption accumulation, and the offset temperature N received from the air-conditioning controller 20. In such a case, at S370, the navigation controller 10 displays an average value of the offset temperatures N in the several data sets read at S325.

(9) In addition, in the above embodiment, the data set recorded in the travel history database contains the actual fuel consumption accumulation amount, tentative fuel consumption accumulation amount, and average preset temperature. Herein, the data set recorded in the travel history database needs to contain at least the actual fuel consumption accumulation amount and tentative fuel consumption accumulation amount. The data set may contain the average preset temperature, actual fuel consumption accumulation amount, and tentative fuel consumption accumulation amount like in the above embodiment. Alternatively, the data set may contain only the actual fuel consumption accumulation amount and tentative fuel consumption accumulation amount.

In addition, the data set of the average preset temperature, actual fuel consumption accumulation amount, and tentative fuel consumption accumulation amount recorded in the travel history database, is recorded in association with the year and month. However, there is no need to be limited thereto. For example, if the storage device 15 of the navigation apparatus 1 has a sufficient storage capacity, the data set may be recorded in the travel history database in association with the year, month, and date. Otherwise, instead of the year and month, the data set may be associated with the season (spring, summer, autumn, winter) which the record period belong to. The season to which the record period belongs may be determined based on the month to which the record period belongs. That is, the timeframe with which the data set is associated may be any time-wise or time-based range, which may be classified as needed.

In addition, the data set of the average preset temperature, actual fuel consumption accumulation amount, and tentative fuel consumption accumulation amount recorded in the travel history database, may be recorded without need of being associated with the timeframe to which the record period belongs. Furthermore, the data sets recorded in the travel history database need not be always associated with the route the vehicle travels in the record period.

(10) In addition, the in-vehicle system and the fuel consumption notification apparatus according to the embodiment may be applicable to not only a hybrid vehicle but also an engine vehicle that runs only on power of the engine. In such a case, only the offset temperature for the cooling state is set up in the air-conditioning apparatus.

(11) According to the embodiment, the navigation controller 10 and the air-conditioning controller 20 perform the programs to implement the functions. The functions may be achieved by a hardware device having the equivalent functions. Such hardware device may include an FPGA capable of programming the circuit construction.

(12) In addition, the data such as the travel history database that need to be recorded may not be stored only in the storage media of the storage device 15 but also, in a storage medium data-retainable even when the main power supply of the navigation apparatus 1 stops such as a flash memory, EEPROM, backup RAM, and HDD. In such a case, the storage media of the storage device 15 do not need to be a rewritable storage media such as HDD and may be a storage media such as DVD, CD-ROM, the data of which cannot be rewritten.

Furthermore, each or any combination of sections explained in the above can be achieved as (i) a software section in combination with a hardware device (e.g., computer or CPU) and/or (ii) a hardware section, including or not including a function of a related device; furthermore, the hardware section may be constructed inside of a microcomputer.

Furthermore, the software section or any combinations of several software sections may be included in a software program, which may be contained in a non-transitory computer-readable storage media as a program product.

In addition, while aspects of the disclosure described herein are already recited in the foregoing, further optional aspects thereto may be set out as follows.

For instance, as an optional aspect of the fuel consumption notification apparatus, a manipulation device may be included to receive an instruction manipulation from a user. The record section may record the data sets of the actual fuel consumption accumulation amounts and the tentative fuel consumption accumulation amounts in the travel history database in association with a plurality of routes the vehicle traveled during the plurality of record periods, respectively. The notification section may read among the plurality of data sets a group of route-specific data sets, which are in association with a specific route that is selected from the plurality of routes based on an instruction manipulation from the user via the manipulation device, and may notify (i) the predetermined offset temperature, a route-specific actual fuel consumption grand total value, and a route-specific tentative fuel consumption grand total value or (ii) the predetermined offset temperature and a difference between the route-specific actual fuel consumption grand total value and the route-specific tentative fuel consumption grand total value. Herein, the route-specific actual fuel consumption grand total value may be identical or equivalent to a total of the actual fuel consumption accumulation amounts contained in the group of route-specific data sets; the route-specific tentative fuel consumption grand total value may be identical or equivalent to a total of the tentative fuel consumption accumulation amounts contained in the group of route-specific data sets.

There may be a case that the preset temperature experienced by the user may be different depending on the route. Even in such a case, as explained above, the fuel consumption display can be made with respect to each of the routes that the user traveled so as to appeal to the travel experience of the user.

Further, as an optional aspect of the fuel consumption notification apparatus, a manipulation device may be included to receive an instruction manipulation from a user. The record section may record the plurality of data sets of the actual fuel consumption accumulation amounts and the tentative fuel consumption accumulation amounts in the travel history database in association with a plurality of timeframes the vehicle travels during the plurality of record periods, respectively. The notification section may read among the plurality of data sets a group of timeframe-specific data sets, which are in association with a specific timeframe that is selected from the plurality of timeframe based on an instruction manipulation from the user via the manipulation device or a present date, and may notify (i) the predetermined offset temperature, a timeframe-specific actual fuel consumption grand total value, and a timeframe-specific tentative fuel consumption grand total value or (ii) the predetermined offset temperature and a difference between the route-specific actual fuel consumption grand total value and the timeframe-specific tentative fuel consumption grand total value. Herein, the timeframe-specific actual fuel consumption grand total value may be identical or equivalent to a total of the actual fuel consumption accumulation amounts contained in the group of timeframe-specific data sets; the timeframe-specific tentative fuel consumption grand total value may be identical or equivalent to a total of the tentative fuel consumption accumulation amounts contained in the group of timeframe-specific data sets.

There is a case where the preset temperature differs depending on the timeframe (e.g., season). In such a case, the fuel consumption display can be made with respect to each of the timeframes that the user traveled so as to appeal to the travel experience of the user.

Further, as an optional aspect in the fuel consumption notification apparatus, the acquisition section may further acquire repeatedly in the each of the plurality of record periods a present preset temperature of the air-conditioning apparatus and a present room temperature of the vehicle. The record section may calculate as a representative preset temperature a representative value of the present preset temperatures acquired by the acquisition section within a statistical period that is contained in the each of the plurality of record periods, and may record further, inside of each of the data sets in the travel history database, the representative preset temperature in the statistical period contained in the each of the plurality of record periods in addition to the actual fuel consumption accumulation amount and the tentative fuel consumption accumulation amount in the each of the plurality of record periods, to collect the plurality of data sets containing the representative preset temperatures, the actual fuel consumption accumulation amounts, and the tentative fuel consumption accumulation amounts over the plurality of data sets. The notification section may read the plurality of data sets from the travel history data, and may notify further a preset temperature grand representative value, in addition to one of (i) the predetermined offset temperature, the actual fuel consumption grand total value, and a tentative fuel consumption grand total value and (ii) the predetermined offset temperature and the difference between the actual fuel consumption grand total value and the tentative fuel consumption grand total value. Herein, the present temperature grand representative value may be a representative value of the representative preset temperatures over the plurality of data sets.

Under such a configuration, a representative preset temperature can be recorded along with the actual fuel consumption accumulation amount and tentative fuel consumption amount with respect to the same record period; further, based on the collected representative preset temperatures, a preset temperature grand representative value is calculated and notified. The user can thus recognize a rough estimate of the preset temperatures that were actually experienced in the past.

In the above configuration, furthermore, the record start condition may include a condition that is fulfilled when a main power source of the vehicle is turned into an ON state or a condition that is fulfilled when the vehicle starts traveling. The record section may take as the statistical period a period, which starts with a time when the present room temperature converges to the present preset temperature first, within the each of the plurality of record periods.

This is because there is a premise as follows. When the room temperature is very high or very low at the time of boarding the vehicle, the user tends to set up so-called an initial or early stage preset temperature to be lower (or higher) than the actual preference temperature so as to bring the room temperature close to the preference temperature earlier. Such an initial preset temperature is typically changed into the actual preference temperature when the room temperature becomes close to the preference temperature. Therefore, such an early stage preset temperature has a thin relation with the cenesthesia or body sense of the user after the room temperature is stabilized; thus, it is excluded from the range of the calculation target of the representative value, i.e., the statistical period as mentioned above. The relation between the representative value of the preset temperatures and the user's body sense becomes thereby thicker.

In contrast, there is another premise with respect to the actual fuel consumption accumulation amount and tentative fuel consumption accumulation amount in consideration that the early stage preset temperature is necessary to bring the room temperature close to the preference temperature. That is, there is less necessity of narrowing down the calculation target for the accumulation into the statistical period. By contrast, if narrowing down, the accumulated fuel consumption amount itself may become inaccurate; thus, the calculation target of the accumulation is not narrowed down into the statistical period.

It will be obvious to those skilled in the art that various changes may be made in the above-described embodiments of the present invention. However, the scope of the present invention should be determined by the following claims.

What is claimed:

1. A fuel consumption notification apparatus for a vehicle having an air-conditioning apparatus,
   the fuel consumption notification apparatus comprising:
   an acquisition section that acquires an actual fuel consumption rate and a tentative fuel consumption rate from the air-conditioning apparatus, repeatedly during each of a plurality of record periods,
      the actual fuel consumption rate being a fuel consumption amount per unit time required to generate an electric power that the air-conditioning apparatus consumes under a present preset temperature,
      the tentative fuel consumption rate being a fuel consumption amount per unit time required to generate an electric power that the air-conditioning apparatus consumes under a post-offset preset temperature, the post-offset preset temperature being obtained by changing the present preset temperature by a predetermined offset temperature,
      the record period being from when a predetermined record start condition is fulfilled to when a predetermined record end condition is fulfilled;
   a record section that records in a travel history database each of a plurality of data sets, the each of the plurality of data sets containing an actual fuel consumption accumulation amount and a tentative fuel consumption accumulation amount in the each of the plurality of record periods, the record section collecting the plurality of data sets over the plurality of record periods in the travel history database,
      the actual fuel consumption accumulation amount being a total fuel consumption amount that is consumed by the air-conditioning apparatus in the each of the plurality of record periods, the actual fuel consumption accumulation amount being calculated based on the actual fuel consumption rate repeatedly acquired by the acquisition section in the each of the plurality of record periods,
      the tentative fuel consumption accumulation amount being a total fuel consumption amount that is estimated to be consumed by the air-conditioning apparatus in the each of the plurality of record periods under a post-offset preset temperature that is obtained by changing the present preset temperature by the predetermined offset temperature, the tentative fuel consumption accumulation amount being calculated based on the tentative fuel consumption rate repeatedly acquired by the acquisition section in the each of the plurality of record periods; and
   a notification section that reads the plurality of data sets from the travel history database, and notifies one of (i) the predetermined offset temperature, an actual fuel consumption grand total value, and a tentative fuel consumption grand total value and (ii) the predetermined offset temperature and a difference between the actual fuel consumption grand total value and the tentative fuel consumption grand total value,
      the actual fuel consumption grand total value being identical or equivalent to a total of the actual fuel consumption accumulation amounts contained in the plurality of data sets, which are read from the travel history database and which are over the plurality of record periods, the tentative fuel consumption grand total value being identical or equivalent to a total of the tentative fuel consumption accumulation amounts contained in the plurality of data sets, which are read from the travel history database and which are over the plurality of record periods.

2. The fuel consumption notification apparatus according to claim 1, further comprising:

a manipulation device that receives an instruction manipulation from a user, wherein:

the record section records the data sets of the actual fuel consumption accumulation amounts and the tentative fuel consumption accumulation amounts in the travel history database in association with a plurality of routes the vehicle traveled during the plurality of record periods, respectively; and the notification section reads among the plurality of data sets a group of route-specific data sets, which are in association with a specific route that is selected from the plurality of routes based on an instruction manipulation from the user via the manipulation device, and notifies (i) the predetermined offset temperature, a route-specific actual fuel consumption grand total value, and a route-specific tentative fuel consumption grand total value or (ii) the predetermined offset temperature and a difference between the route-specific actual fuel consumption grand total value and the route-specific tentative fuel consumption grand total value, the route-specific actual fuel consumption grand total value being identical or equivalent to a total of the actual fuel consumption accumulation amounts contained in the group of route-specific data sets, the route-specific tentative fuel consumption grand total value being identical or equivalent to a total of the tentative fuel consumption accumulation amounts contained in the group of route-specific data sets.

3. The fuel consumption notification apparatus according to claim 1, further comprising:

a manipulation device that receives an instruction manipulation from a user, wherein:

the record section records the plurality of data sets of the actual fuel consumption accumulation amounts and the tentative fuel consumption accumulation amounts in the travel history database in association with a plurality of timeframes the vehicle travels during the plurality of record periods, respectively;

the notification section reads among the plurality of data sets a group of timeframe-specific data sets, which are in association with a specific timeframe that is selected from the plurality of timeframe based on an instruction manipulation from the user via the manipulation device or a present date, and notifies (i) the predetermined offset temperature, a timeframe-specific actual fuel consumption grand total value, and a timeframe-specific tentative fuel consumption grand total value or (ii) the predetermined offset temperature and a difference between the route-specific actual fuel consumption grand total value and the timeframe-specific tentative fuel consumption grand total value, the timeframe-specific actual fuel consumption grand total value being identical or equivalent to a total of the actual fuel consumption accumulation amounts contained in the group of timeframe-specific data sets, the timeframe-specific tentative fuel consumption grand total value being identical or equivalent to a total of the tentative fuel consumption accumulation amounts contained in the group of timeframe-specific data sets.

4. The fuel consumption notification apparatus according to claim 1, wherein:

the acquisition section further acquires repeatedly in the each of the plurality of record periods a present preset temperature of the air-conditioning apparatus and a present room temperature of the vehicle;

the record section calculates as a representative preset temperature a representative value of the present preset temperatures acquired by the acquisition section within a statistical period that is contained in the each of the plurality of record periods, records further, inside of each of the data sets in the travel history database, the representative preset temperature in the statistical period contained in the each of the plurality of record periods in addition to the actual fuel consumption accumulation amount and the tentative fuel consumption accumulation amount in the each of the plurality of record periods, to collect the plurality of data sets containing the representative preset temperatures, the actual fuel consumption accumulation amounts, and the tentative fuel consumption accumulation amounts over the plurality of data sets; and the notification section reads the plurality of data sets from the travel history data, and notifies further a preset temperature grand representative value, in addition to one of (i) the predetermined offset temperature, the actual fuel consumption grand total value, and a tentative fuel consumption grand total value and (ii) the predetermined offset temperature and the difference between the actual fuel consumption grand total value and the tentative fuel consumption grand total value, the present temperature grand representative value being a representative value of the representative preset temperatures over the plurality of data sets.

5. The fuel consumption notification apparatus according to claim 4, wherein:

the record start condition includes a condition that is fulfilled when a main power source of the vehicle is turned into an ON state or a condition that is fulfilled when the vehicle starts traveling; and the record section takes as the statistical period a period, which starts with a time when the present room temperature converges to the present preset temperature first, within the each of the plurality of record periods.

6. A program product stored in a non-transitory computer-readable media comprising instructions for execution by a computer, the instructions enabling the computer to function as the acquisition section, the record section, and the notification section included in the fuel consumption notification apparatus according to claim 1.

7. An in-vehicle apparatus in a vehicle having an air-conditioning apparatus, the apparatus comprising:
- an actual fuel consumption rate specification section that specifies an actual fuel consumption rate, which is a fuel consumption amount per unit time required to generate an electric power that the air-conditioning apparatus consumes under a present preset temperature;
- a tentative fuel consumption rate specification section that specifies a tentative fuel consumption rate, which is a fuel consumption amount per unit time required to generate an electric power that the air-conditioning apparatus consumes under a post-offset preset temperature, which is obtained by changing the present preset temperature by a predetermined offset temperature, based on a table that associates temperatures with tentative fuel consumption rates or equivalent values converted from the tentative fuel consumption rates;
- an acquisition section that acquires the actual fuel consumption rate specified by the actual fuel consumption rate specification section and the tentative fuel consumption rate specified by the tentative fuel consumption rate specification section, repeatedly during each of a plurality of record periods, the record period being from when a predetermined record start condition is fulfilled to when a predetermined record end condition is fulfilled;
- a record section that records in a travel history database repeatedly each of a plurality of data sets, the each containing an actual fuel consumption accumulation amount and a tentative fuel consumption accumulation amount in the each of the plurality of record periods to collect the plurality of data sets over the plurality of record periods in the travel history database,
  - the actual fuel consumption accumulation amount being a total fuel consumption amount that is consumed by the air-conditioning apparatus in the each of the plurality of record periods, the actual fuel consumption accumulation amount being calculated based on the actual fuel consumption rate repeatedly acquired by the acquisition section in the each of the plurality of record periods,
  - the tentative fuel consumption accumulation amount being a total fuel consumption amount that is estimated to be consumed by the air-conditioning apparatus in the each of the plurality of record periods under a post-offset preset temperature that is obtained by changing the present preset temperature by the predetermined offset temperature, the tentative fuel consumption accumulation amount being calculated based on the tentative fuel consumption rate repeatedly acquired by the acquisition section in the each of the plurality of record periods; and
- a notification section that reads the plurality of data sets from the travel history database, and notifies one of (i) the predetermined offset temperature, an actual fuel consumption grand total value, and a tentative fuel consumption grand total value and (ii) the predetermined offset temperature and a difference between the actual fuel consumption grand total value and the tentative fuel consumption grand total value,
  - the actual fuel consumption grand total value being identical or equivalent to a total of the actual fuel consumption accumulation amounts contained in the plurality of data sets, which are read from the travel history database and which are over the plurality of record periods,
  - the tentative fuel consumption grand total value being identical or equivalent to a total of the tentative fuel consumption accumulation amounts contained in the plurality of data sets, which are read from the travel history database and which are over the plurality of record periods.

8. A method for notifying a fuel consumption by a computer in a vehicle having an air-conditioning apparatus, the method comprising:
- specifying an actual fuel consumption rate, which is a fuel consumption amount per unit time required to generate an electric power that the air-conditioning apparatus consumes under a present preset temperature;
- specifying a tentative fuel consumption rate, which is a fuel consumption amount per unit time required to generate an electric power that the air-conditioning apparatus consumes under a post-offset preset temperature, which is obtained by changing the present preset temperature by a predetermined offset temperature, based on a table that associates temperatures with tentative fuel consumption rates or equivalent values converted from the tentative fuel consumption rates;
- acquiring the actual fuel consumption rate that was specified and the tentative fuel consumption rate that was specified, repeatedly during each of a plurality of record periods, the record period being from when a predetermined record start condition is fulfilled to when a predetermined record end condition is fulfilled;
- recording in a travel history database each of a plurality of data sets, the each containing an actual fuel consumption accumulation amount and a tentative fuel consumption accumulation amount in the each of the plurality of record periods to collect the plurality of data sets over the plurality of record periods in the travel history database,
  - the actual fuel consumption accumulation amount being a total fuel consumption amount that is consumed by the air-conditioning apparatus in the each of the plurality of record periods, the actual fuel consumption accumulation amount being calculated based on the actual fuel consumption rate repeatedly acquired in the each of the plurality of record periods,
  - the tentative fuel consumption accumulation amount being a total fuel consumption amount that is estimated to be consumed by the air-conditioning apparatus in the each of the plurality of record periods under a post-offset preset temperature that is obtained by changing the present preset temperature by the predetermined offset temperature, the tentative fuel consumption accumulation amount being calculated based on the tentative fuel consumption rate repeatedly acquired in the each of the plurality of record periods;
- reading the plurality of data sets from the travel history database; and
- notifying one of (i) the predetermined offset temperature, an actual fuel consumption grand total value, and a tentative fuel consumption grand total value and (ii) the predetermined offset temperature and a difference between the actual fuel consumption grand total value and the tentative fuel consumption grand total value,
  - the actual fuel consumption grand total value being identical or equivalent to a total of the actual fuel consumption accumulation amounts contained in the plurality of data sets, which are read from the travel history database and which are over the plurality of record periods,
  - the tentative fuel consumption grand total value being identical or equivalent to a total of the tentative fuel consumption accumulation amounts contained in the plurality of data sets, which are read from the travel history database and which are over the plurality of record periods.

9. A program product stored in a non-transitory computer readable storage medium comprising instructions for execution by a computer, the instructions including the method for notifying the fuel consumption in the vehicle according to claim 8, the method being computer-implemented.

* * * * *